June 13, 1967  F. W. FERNHOLTZ  3,324,801
COMBINED FLEXIBLE SEAL AND AGITATOR FOR PUMPS
Filed Aug. 17, 1965
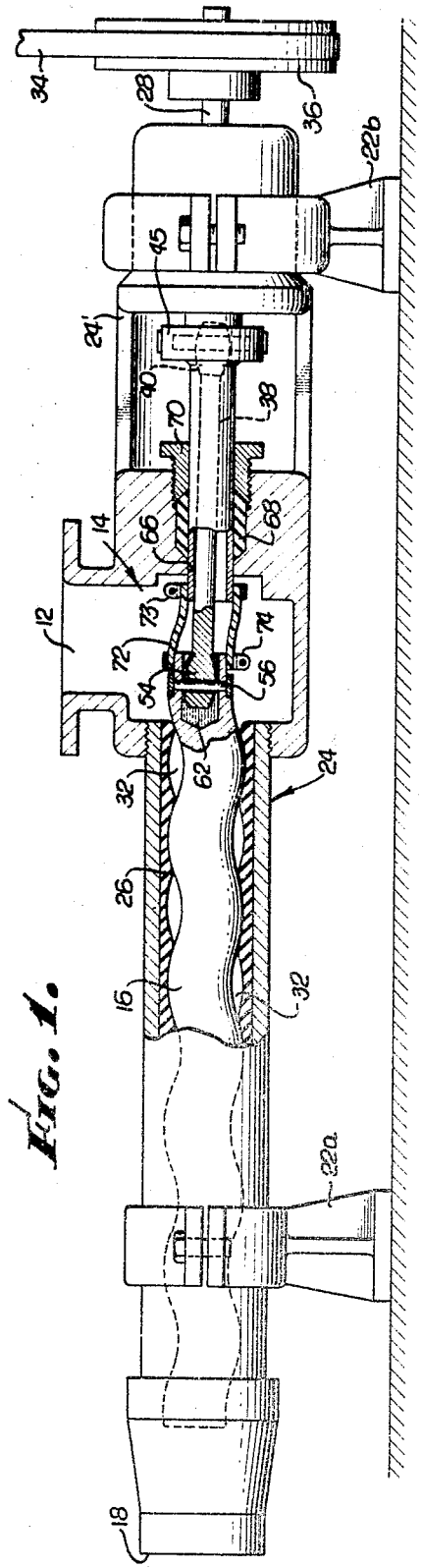
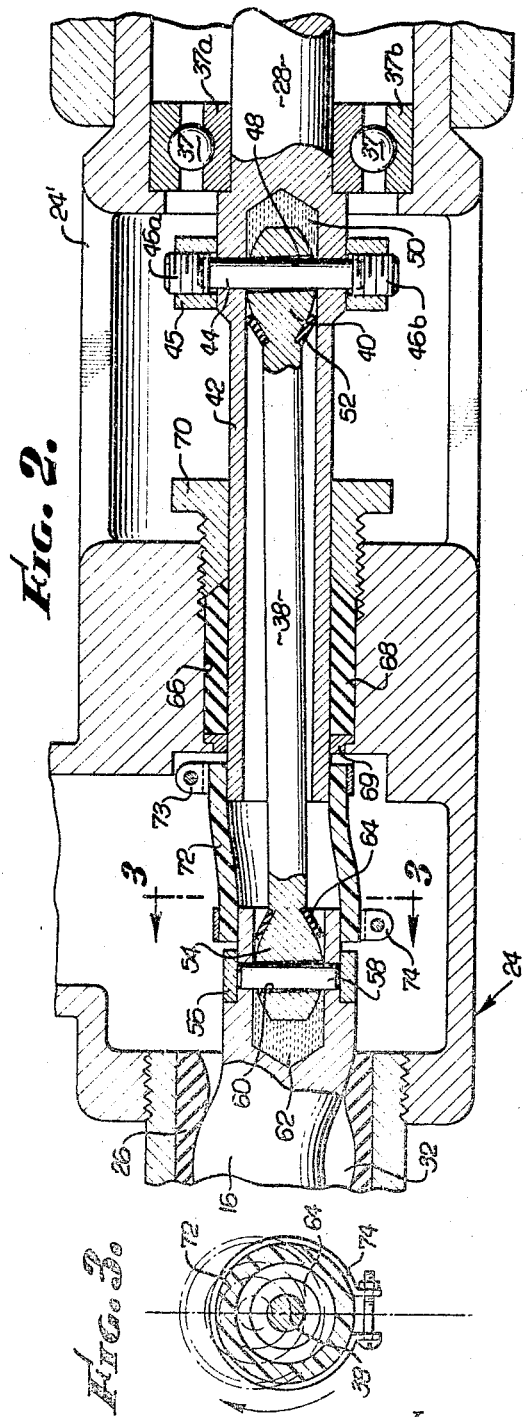
INVENTOR.
FRANK W. FERNHOLTZ
BY Huebner & Worrel
ATTORNEYS.

United States Patent Office 3,324,801
Patented June 13, 1967

3,324,801
COMBINED FLEXIBLE SEAL AND AGITATOR FOR PUMPS
Frank W. Fernholtz, Van Nuys, Calif., assignor to Fernholtz Manufacturing Company, Los Angeles, Calif., a corporation of California
Filed Aug. 17, 1965, Ser. No. 480,419
5 Claims. (Cl. 103—117)

This invention relates to sealing and agitating apparatus for pumps. More particularly, this invention relates to a combined flexible seal and agitator especially adapted for use in helical gear pumps.

In helical gear pumps, the material being pumped generally passes the interconnection between the helical gear rotor and the axial drive shaft in a portion of the feed passageway called a stuffing box. It is important that the material being pumped does not leak from the stuffing box through the packing around the drive shaft into the driving means. Thus, special attention has been given to such apparatus to see that adequate seals are provided in helical gear pumps between the drive shaft and the driving means when the drive shaft is exposed to the material being pumped. Since such material being pumped is often highly viscous, it is desirable to agitate it in the stuffing box to facilitate pumping. An effective, efficient means for providing such agitation would be to connect the rotor and drive shaft in such a manner that the connected portions revolve elliptically within the stuffing box. However, such significant problems in sealing are created by this approach that agitation of pumped material prior to this invention generally has been accomplished through cumbersome, less efficient methods.

Therefore, it is a primary object of this invention to provide a helical gear pump with efficient integrally sealed means for agitating material being pumped.

Another object of this invention is to provide a combined agitator and flexible seal for protecting the operative parts of a helical gear pump from material being pumped.

Still another object of this invention is to provide an interconnection between the drive means and rotor of a helical gear pump which will revolve eccentrically in the stuffing box of the pump so as to agitate material therein and at the same time provide a flexible, tight seal between the drive means and the rotor.

Other objects and advantages of this invention will be apparent from the following illustrative description.

In the drawings:

FIGURE 1 is an elevational view of a helical gear pump with a cut-away longitudinal section showing the combined flexible seal, agitator and immediately surrounding structure in accordance with the invention;

FIGURE 2 is an enlarged longitudinal sectional view of the rotor, flexible seal, drive shaft and driving means interconnection shown in the cut-away portion of FIGURE 1; and FIGURE 3 is a cross-sectional view of the flexible seal taken through 3—3 of FIGURE 2, showing in ghost lines the elliptical path taken by the seal when the interconnected drive shaft is rotated.

This invention is specifically adapted for use in a helical gear pump as shown, wherein material to be pumped enters through port 12, flows into stuffing box 14, is driven down a screw feed by rotor 16 and is discharged from the pump via outlet 18. Suction is created within such a pump which varies in accordance with its construction and the speed of its pumping apparatus.

The pump is particularly adapted for use with viscous fluid substances which may contain solid particles. In fact, it is designed to pump nearly anything that flows.

The helical gear pump shown in FIGURE 1 is cradled by supporting mounts 22a and 22b. It includes a generally elongated tubular housing 24 having an interior helically convoluted stator 26. Helically twisted rotor 16 is rotatably seated within housing 24 where it bears against stator 26, and is axially interconnected to drive shaft 28. The space between rotor 16 and stator 26 defines passageways 32, which provide a means for screw-feeding material from stuffing box 14 to outlet 18.

Drive shaft 28, disposed within housing 24' on the opposite side of stuffing box 14 from rotor 16, is rotated by a suitable power source (not shown) via drive band 34 and axially interconnected driven wheel 36. Radial ball bearings 37 mounted in races 37a and 37b help provide drive shaft 28 with suitable rotatable support. Rotor 16 and drive shaft 28 are axially linked by connecting rod 38. Enlarged rounded end 40 of connecting rod 38 is attached within an extended cylindrical sleeve 42 of drive shaft 28 by means of pin 44 which is loosely secured in position through opening 48 in end 40 by threaded screw fasteners 46a and 46b which are, in turn, mounted in peripherally disposed collar 45. A grease reservoir 50 is provided within shaft 28 proximate to end 40 of connecting rod 38 and resilient annular seal 52 is disposed between end 40 and the interior of sleeve 42.

In a similar manner, enlarged rounded end 54 of connecting rod 38 is attached within a short cylindrical sleeve 56 of rotor 16 by means of pin 58, which extends through opening 60 in end 54. A grease reservoir 62 and resilient annular seal 64 are disposed with sleeve 56 adjacent end 54.

When drive shaft 28 is rotated, the portion of rotor 16 and connecting rod 38 interconnected within stuffing box 14 is revolved elliptically as shown in FIGURE 3. In this respect, it should be noted that adequate spacing between connecting rod 38 and the interior of sleeve 42 is provided to allow room for such movement.

In order to prevent the leaking of material being pumped from flowing into opening 66 within which sleeve 42 is rotatably seated, an annular packing seal 68 is disposed between a packing gland insert 69 and packing gland 70 encasing the periphery of sleeve 42. And, to keep material in stuffing box 14 from entering into the interior of sleeve 42, a flexible annular collar seal 72 is peripherally connected between the adjacent ends of drive shaft sleeve 42 and rotor sleeve 56 by drive shaft seal band 73 and rotor seal band 74, respectively. Since this portion of the interconnection between rotor 16 and drive shaft 28 will rotate in an eccentric path, it is essential that seal 72 be flexible enough to withstand the stress and strain of a continuous stretching. At the same time, seal 72 will serve as an agitator of material in stuffing box 14 because of the eccentric path it takes when revolved therein. It is also desirable that the exterior surface of seal 72 be slick or smooth enough to prevent material being pumped from jamming the drive shaft and blocking suction or straining the driving means.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the claims.

What is claimed is:

1. A helical gear pump including a stuffing box into which material to be pumped is fed, a screw feed rotor, a drive shaft spaced from said rotor, a connecting rod axially solely engaging and linking said rotor and drive shaft so that rotation of the drive shaft causes a connected portion of said connecting rod and rotor to revolve elliptically within the stuffing box the opposite end of said connecting rod universally movably secured to said drive shaft exterior of said stuffing box, and flexible annular sealing means disposed around the connecting rod link with said rotor in such a manner that no material being pumped leaks therein.

2. A helical pump as defined in claim 1, wherein the adjacent end portions of the rotor and the drive shaft are tubular, the connecting rod is secured between the rotor and the drive shaft within the tubular end portions thereof, resilient rod sealing means are interposed within each of said tubular end portions around said rod and the flexible annular sealing means is a resilient collar tightly secured between the periphery of the adjacent tubular end portions of said rotor and drive shaft so as to completely surround the connecting rod.

3. A helical gear pump as defined in claim 2, wherein the connecting rod has rounded enlargements at each of its ends which are linked to the rotor and drive shaft respectively, the rod sealing means are resilient annular rings mounted on said connecting rod bearing against the interior of said tubular end portions to provide grease reservoirs therein for said rounded enlargements thereof and a sufficient space is provided within the tubular end portions of the rotor and drive shaft that the connecting rod disposed therein can freely elliptically revolve.

4. A helical gear pump including a stuffing box into which material to be pumped is fed, a helically convoluated screw feed rotor having a shallow, recessed tubular end portion and a drive shaft having a deeply recessed tubular end portion each of which is axially rotatably mounted within said pump with their tubular ends protruding toward but spaced from each other within said stuffing box, a connecting rod having rounded enlargements at each end, said connecting rod solely linking said rotor and drive shaft by universally movable attachment of said rounded end enlargements within the respective tubular end portions of said rotor and drive shaft in such a manner that rotation of the drive shaft causes said connecting rod to revolve elliptically within the stuffing box of the pump and a flexible annular sealing collar tightly secured between the periphery of the adjacent tubular end portions of said rotor and drive shaft within said stuffing box so as to completely surround the connecting rod and seal it from the stuffing box, said sealing collar moving in an elliptical path when the drive shaft is rotated and agitating material within the stuffing box.

5. A helical gear pump comprising: a tubular housing having an inlet opening into a stuffing box; an elongated screw feed passageway extending axially from said stuffing box to an outlet orifice; an eccentrically rotatable, helically twisted rotor mounted in said screw feed passageway with one end extending partly into said stuffing box; a rotatable drive shaft axially mounted on the opposite side of said stuffing box from said rotor, said drive shaft having an extended hollow sleeve end portion protruding partly into said stuffing box which is axially spaced from and does not bear against any part of said rotor in said stuffing box; a rotor grease reservoir recessed within the end of the rotor which extends into said stuffing box; a drive shaft grease reservoir recessed within the sleeve end portion of said drive shaft; an elongated connecting rod secured between said rotor and said drive shaft which is smaller in diameter than the interior of said extended sleeve thereof, said connecting rod formed with a rounded universally movable, rotor end joint sealingly mounted within said rotor grease reservoir and, on the opposite end, a rounded, universally movable, drive shaft end joint sealingly mounted within said drive shaft reservoir; and a flexible annular collar attached between the end of said rotor and said drive shaft within said stuffing box, said collar completely enclosing the space between said rotor and said drive shaft and sealing the interior thereof from exposure to substances in said stuffing box but being sufficiently flexible to allow eccentric rotation in said stuffing box of said rotor end relative to axial rotation of said drive shaft.

References Cited
UNITED STATES PATENTS 2,915,979 12/1959 Bourke et al. _____ 103—117

FOREIGN PATENTS 1,361,840 4/1964 France.
602,794 3/1960 Italy.

DONLEY J. STOCKING, *Primary Examiner.*

R. M. VARGO, W. J. GOODLIN, *Assistant Examiners.*